US012315312B2

(12) United States Patent
Tenorio et al.

(10) Patent No.: US 12,315,312 B2
(45) Date of Patent: May 27, 2025

(54) SYSTEMS AND METHOD FOR IDENTIFYING TRACTORS ASSOCIATED WITH FAULTS AT A TRAILER OR DOLLY

(71) Applicant: Bendix Commercial Vehicle Systems LLC, Avon, OH (US)

(72) Inventors: Stephania Lopez Tenorio, Munich (DE); Anna F Frashure, Columbia Station, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 404 days.

(21) Appl. No.: 18/073,978

(22) Filed: Dec. 2, 2022

(65) Prior Publication Data
US 2024/0185649 A1    Jun. 6, 2024

(51) Int. Cl.
*G07C 5/08* (2006.01)
*B60T 17/22* (2006.01)
*G07C 5/00* (2006.01)

(52) U.S. Cl.
CPC ............ *G07C 5/0808* (2013.01); *B60T 17/22* (2013.01); *G07C 5/008* (2013.01); *G07C 5/0825* (2013.01)

(58) Field of Classification Search
None
See application file for complete search history.

(56) References Cited

U.S. PATENT DOCUMENTS

| | | | | |
|---|---|---|---|---|
| 5,204,819 A | * | 4/1993 | Ryan | B67D 7/08 705/413 |
| 5,905,433 A | * | 5/1999 | Wortham | G07C 5/008 340/3.4 |
| 5,999,091 A | * | 12/1999 | Wortham | G08G 1/20 340/10.2 |
| 7,280,898 B2 | * | 10/2007 | Lesesky | G07C 5/085 701/31.5 |
| 7,413,266 B2 | * | 8/2008 | Lenz | B60T 8/17554 303/7 |
| 7,823,441 B2 | * | 11/2010 | Beverly | B60C 23/00354 73/113.01 |
| 7,944,345 B2 | * | 5/2011 | Brinton | G06Q 10/06 340/576 |
| 8,897,957 B2 | * | 11/2014 | Stoehr | B60T 8/1708 701/36 |

(Continued)

OTHER PUBLICATIONS

Jonathan Mueller, "Trailer Vehicle Identification Number (VIN) and Sequencing System Using Powerline", FMCSA, https://www.fmcsa.dot.gov/research-and-analysis/technology/automated-trailer-vehicle-id-number-and-sequencing-system, Oct. 21, 2021.

*Primary Examiner* — Jonathan M Dager
(74) *Attorney, Agent, or Firm* — Crowell & Moring LLP

(57) ABSTRACT

The present disclosure provides systems and methods that identify tractors associated with faults at a trailer or a dolly in a tractor trailer configuration. In one form, the present disclosure provides a system positioned on a trailer that comprises a memory and at least one processor of a braking system. The at least one processor is configured to execute instructions stored in the memory and to receive a VIN from a tractor that is connected to the trailer; detect a fault of the braking system of the trailer; and associate the VIN of the tractor with the fault of the braking system and store the associated fault of the braking system and the VIN of the tractor in the memory.

20 Claims, 2 Drawing Sheets

(56) References Cited

U.S. PATENT DOCUMENTS

| | | | |
|---|---|---|---|
| 9,623,849 B2* | 4/2017 | Spath | B60T 8/171 |
| 9,821,779 B2* | 11/2017 | Grandstaff | B60T 7/20 |
| 10,670,479 B2* | 6/2020 | Reed | G01L 5/136 |
| 10,814,844 B2* | 10/2020 | Kasper | B60D 1/62 |
| 10,924,905 B2* | 2/2021 | Lotz | H04W 76/10 |
| 10,994,711 B2* | 5/2021 | Decker, Jr. | B60T 17/22 |
| 11,260,837 B2* | 3/2022 | Zhou | B60Q 9/00 |
| 11,292,445 B2* | 4/2022 | Bensch | B60T 7/12 |
| 11,302,120 B2* | 4/2022 | Hößle | G07C 5/0816 |
| 11,394,427 B2* | 7/2022 | Kasper | B60D 1/481 |
| 11,496,816 B2* | 11/2022 | Troutman | H04L 67/12 |
| 2004/0083040 A1* | 4/2004 | Parrott | G07C 5/085 701/29.6 |
| 2010/0131167 A1* | 5/2010 | Greene | B60T 7/18 303/9.66 |
| 2012/0330502 A1* | 12/2012 | Greene | B60T 7/18 701/33.9 |
| 2013/0085668 A1* | 4/2013 | Roberts, Sr. | G08G 1/20 701/465 |
| 2014/0226010 A1* | 8/2014 | Molin | H04N 7/01 340/576 |
| 2015/0012199 A1* | 1/2015 | Mederer | B60T 8/1708 701/70 |
| 2015/0094906 A1* | 4/2015 | Greene | B60T 13/263 701/33.9 |
| 2015/0210257 A1* | 7/2015 | Matoy | B60T 8/1887 701/70 |
| 2015/0349977 A1* | 12/2015 | Risse | H04L 12/6418 375/257 |
| 2017/0120886 A1* | 5/2017 | Shin | B60T 8/885 |
| 2018/0093606 A1* | 4/2018 | Terwilliger | H04W 4/46 |
| 2019/0111984 A2* | 4/2019 | Bean | B62D 63/08 |
| 2020/0114896 A1* | 4/2020 | Kennedy | B60T 13/263 |
| 2020/0118361 A1* | 4/2020 | Zula | G01M 17/007 |
| 2020/0160723 A1* | 5/2020 | Switkes | G05D 1/0027 |
| 2023/0013950 A1* | 1/2023 | König | H04L 67/5651 |
| 2024/0067283 A1* | 2/2024 | Javidan | B62D 59/04 |
| 2024/0116584 A1* | 4/2024 | Anduray | B62D 53/125 |
| 2024/0140373 A1* | 5/2024 | Augoustidis | B60T 17/22 |
| 2024/0182042 A1* | 6/2024 | Thomas | B60W 30/02 |
| 2024/0185651 A1* | 6/2024 | Thomas | G07C 5/0825 |
| 2024/0198981 A1* | 6/2024 | Eckert | B60T 13/263 |
| 2024/0367625 A1* | 11/2024 | Pahl | B60G 17/017 |

* cited by examiner

SYSTEMS AND METHOD FOR IDENTIFYING TRACTORS ASSOCIATED WITH FAULTS AT A TRAILER OR DOLLY

BACKGROUND

In conventional tractor trailer configurations, trailers include an antilock braking system (ABS) that monitors performance of the ABS system at the trailer and records faults within the ABS system as they occur. The ABS system monitors and records the faults within the ABS system regardless of what tractor the trailer is coupled with. As a result, when a report of the recorded faults at the ABS system is examined, it is difficult to determine if a specific tractor or even a specific type of tractor is contributing to the recorded faults at the ABS controller of the trailer.

SUMMARY

The present disclosure addresses the above-describe problem and provides systems and methods that identify tractors associated with faults at a trailer or a dolly in a tractor trailer configuration. In some implementations, the described systems and method provide the ability to record an identifier of a tractor or a dolly, such as a vehicle identification number ("VIN"), when a fault is detected at a trailer. As a result, when a plurality of faults at a trailer are examined, patterns with associated tractors or types of tractors can be identified.

In one aspect, the present disclosure provides a system positioned on a trailer that comprises a memory and at least one processor of a braking system. The at least one processor is configured to execute instructions stored in the memory and to receive a VIN from a tractor that is connected to the trailer; detect a fault of the braking system of the trailer; and associate the VIN of the tractor with the fault of the braking system and store the associated fault of the braking system and the VIN of the tractor in the memory.

In some implementations, the at least one processor is further configured to analyze a plurality of faults and associated VINs stored in the memory and determine that a number of faults of the braking system of the trailer that are associated with the VIN of the tractor exceeds a threshold; and to send a message to at least one of the tractor or a fleet system in response to the determination that the number of faults of the braking system of the trailer that are associated with the VIN of the tractor exceeds the threshold.

In another aspect, the present disclosure provides a method in which at least one processor of a braking system positioned on a trailer receives a VIN from a tractor that is connected to the trailer; detects a fault of the braking system of the trailer; and associates the VIN of the tractor with the fault of the braking system and stores the associated fault of the braking system and the VIN of the tractor in a memory.

In some implementations, the method further includes the at least one processor analyzing a plurality of faults and associated VINs stored in the memory and determining that a number of faults of the braking system of the trailer that are associated with the VIN of the tractor exceeds a threshold; and sending a message to at least one of the tractor or a fleet system in response to determining that the number of faults of the braking system of the trailer that are associated with the VIN of the tractor exceeds the threshold.

In yet another aspect, the present disclosure provides an additional system positioned on a trailer that comprises a memory and at least one processor of a braking system. The at least one processor is configured to execute instructions stored in the memory and to receive a first VIN from a tractor that is connected to the trailer; receive a second VIN from a dolly that is connected to the trailer; and detect a fault of the braking system of the dolly. The at least one processor is further configured to associate the first VIN of the tractor and the second VIN of the dolly with the fault of the braking system and store the associated fault of the braking system and the first VIN of the tractor and the second VIN of the dolly in the memory.

In some implementations, the at least one processor is further configured to analyze a plurality of faults and associated VINs stored in the memory and determine that a number of faults of the braking system of the dolly that are associated with the VIN of the dolly exceeds a threshold; and to send a message to at least one of the tractor or a fleet system in response to the determination that the number of faults of the braking system of the dolly that are associated with the VIN of the dolly exceeds the threshold.

DETAILED DESCRIPTION

The present disclosure is directed to systems and methods for identifying tractors associated with faults at a trailer or a dolly in a tractor trailer configuration. In some implementations, the described systems and method provide the ability to record an identifier of a tractor or a dolly, such as a vehicle identification number ("VIN"), when a system fault is detected at a trailer. As a result, when the systems faults at the trailer are examined for potential repair of the trailer, patterns can be identified between the recorded faults and associated tractors or types of tractors.

Figure 1:
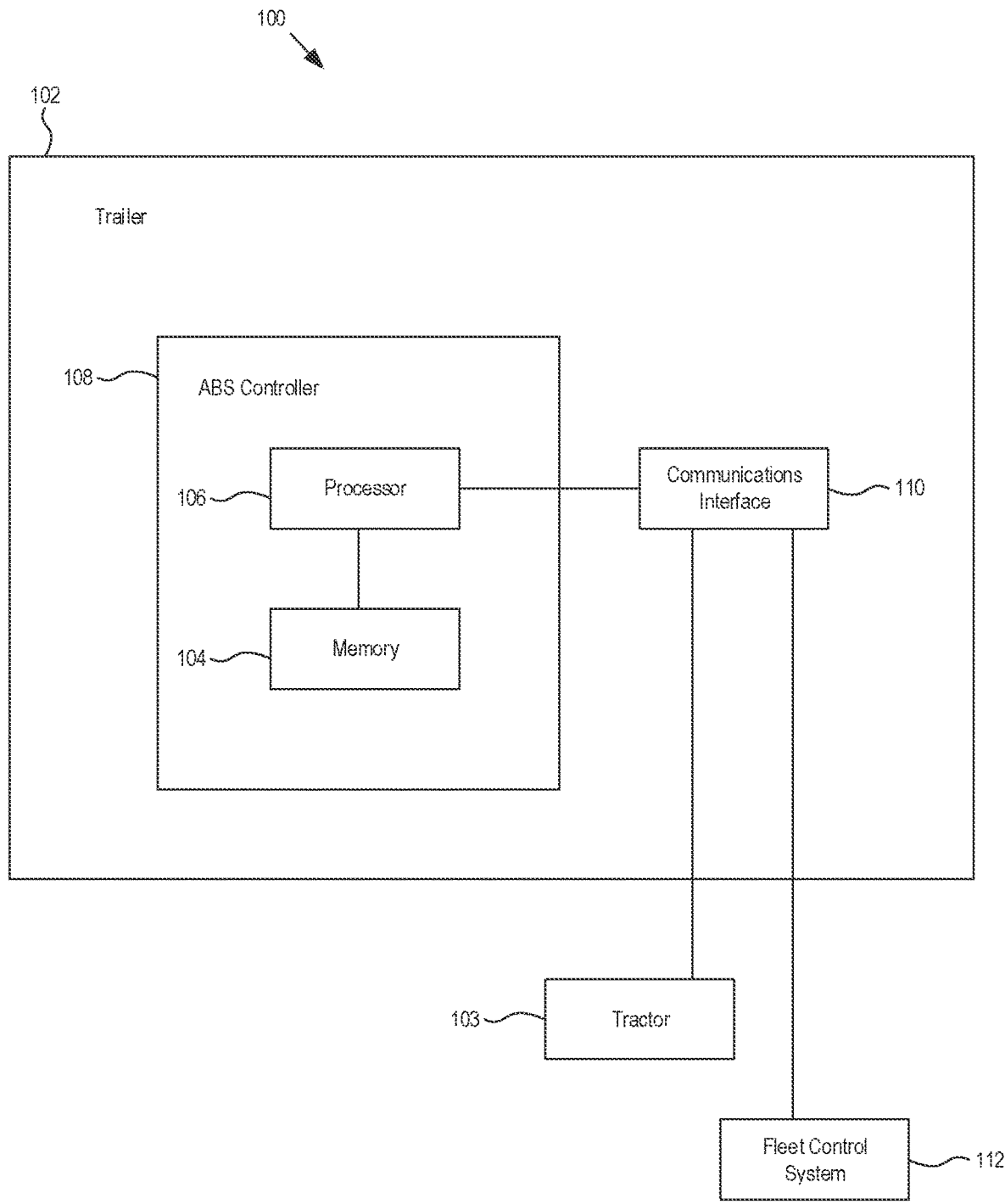
FIG. 1 is a block diagram of one form of a system for identifying tractors associated with faults at a trailer or dolly in a tractor trailer configuration.

FIG. 1 is a block diagram of one form of a system 100 for identifying tractors or dollies associated with faults at a trailer in a tractor trailer configuration. In some implementations, the system 100 is positioned on a trailer 102 that is utilized in a tractor trailer configuration where the trailer 102 is coupled with a vehicle such as a tractor 103. However, in other implementations, the described system 100 may be positioned on another part of the tractor trailer configuration or utilized with other types of vehicles and/or trailer configurations.

The system 100 includes memory 104 and one or more processors 106 in communication with the memory that are configured to execute instructions stored in the memory 104. The processor may be a controller, a central processing unit, or any other type of electronic circuitry able to execute instructions stored in the memory 104.

In some implementations, the memory 104 and/or the one or more processors 106 may be part of an anti-lock braking system (ABS) controller 108 of the trailer 102. However, in other implementations, the memory 104 and/or the one or more processors 106 may be in communication with the ABS controller 108, but distinct from the ABS controller 108.

The system 100 further includes a communication interface 110 that allows the one or more processors 106 to communicate with a vehicle such as a tractor, other trailers, and/or dollies within the tractor-trailer configuration. In some implementations the communication interface 110 provides for wired communications over powerline carriers or ethernet cable between the system 100 and the vehicle such as a tractor, other trailers, and/or dollies within the vehicle trailer configuration. However, in other implementations, all or part of the communications may be wireless, such as cellular, WiFi, or Bluetooth.

In some implementations, the communication interface 110 provides the system the ability to communicate with servers of a fleet control system 112. This includes wired communications when the trailer is parked at a facility providing wired access or wireless communications over WiFi, Bluetooth, or cellular networks while the trailer is parked or while the trailer is traveling to a destination.

As described in more detail below, during operation, the system 100 positioned on the trailer 102 receives an identifier, such as a VIN, from a tractor and any dollies within the tractor trailer configuration. In some implementations, the system 100 requests the identifier from the tractor and any dollies within the tractor trailer configuration when the trailer is powered up.

As the ABS controller 108 of the trailer 102 detects a fault during operation of the trailer 102, the system 100 associates the VIN of the tractor 103 and/or any dollies with the detected fault and records the association in the memory 104. This process is repeated as the trailer 102 is operated with a plurality of tractors 103.

The system 102 or the fleet control system 112 analyzes the plurality of faults at the trailer 102 and the associated VINs, and may identify if a particular tractor or type of tractor is associated with a particular type of fault at the trailer 102. Additionally, the system 102 and or fleet control system 112 may alert the driver of a tractor 103 upon a determination that the tractor 103 is contributing to the system fault at the trailer 102.

Figure 2:
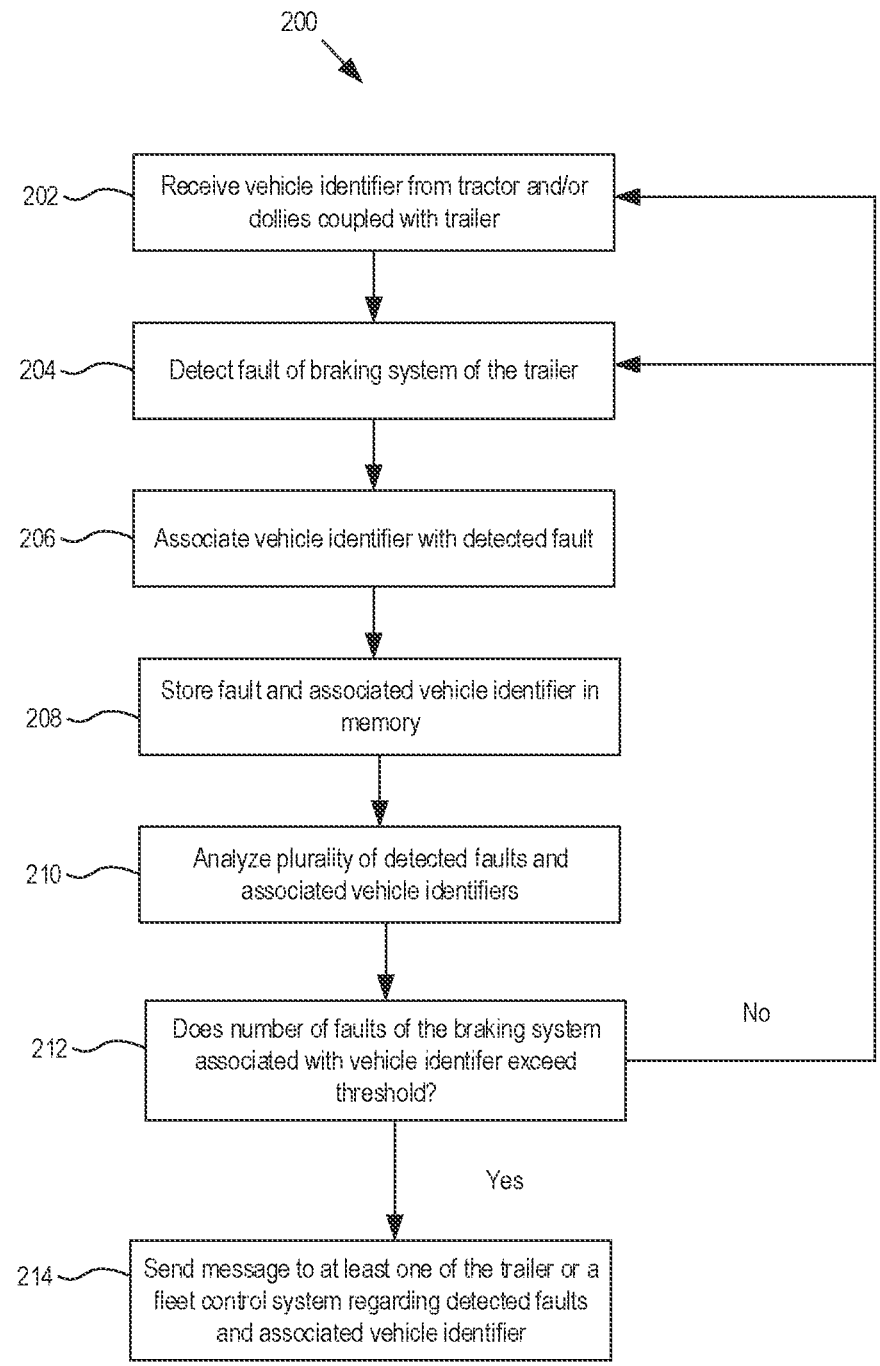
FIG. 2 is a flow chart of one form of a method for identifying tractors associated with faults at a trailer or dolly in a tractor trailer configuration.

FIG. 2 is a flow chart of one form of a method for identifying tractors or dollies in a tractor trailer configuration that are associated with faults at a trailer. In some implementations, the following method may be performed with a system such as the system described above in conjunction with claim 1.

At step 202, at least one processor of a braking system positioned on a trailer receives an identifier, such as a vehicle identification identifier (VIN), for a tractor coupled with the trailer. In tractor trailer configurations that also include one or more dollies, the at least one processor may also receive VINs from the dollies. As discussed above in conjunction with FIG. 1, the at least one processor may receive the identifiers over wired or wireless communications.

In some implementations, the at least one processor requests the identifiers from the tractor and any dollies when the trailer is powered up. However, in other implementations, the at least one processor receives the identifier from the tractor and any dollies without the at least one processor requesting them.

At step 204, the at least one processor detects a fault of the braking system of the trailer. In some implementations, the at least one processor detects the fault of the braking system as part of, or in coordination with, an ABS controller of the trailer.

For example, the at least one processor may detect a voltage fault, a trailer roll stability fault (TRSP), a low pressure fault, a dynamic pressure fault, and/or a reverse object detection fault.

In general, the at least one processor may detect a voltage fault when the ABS system of the trailer is not receiving sufficient voltage to operate. The at least one processor may detect a trailer roll stability fault when an intervention occurs due to an instability event that is detected, such as when a trailer is about to roll over. This may occur, for example, when a driver is driving a vehicle recklessly such as changing lanes too quickly or driving at excessive speeds around a curve or when taking an exit. In some implementations, as part of a trailer roll stability fault, the ABS controller may record a strength of the brake pressure applied to the wheels to prevent the trailer from rolling over.

Additionally, the at least one processor may detect a low pressure fault when a pressure in a braking system falls below a threshold due to, for example, a leak in the braking system, a kink is present in an air line of the braking system, when an air supply line of the braking system was not connected or not properly connected between a tractor and a trailer, and/or when a driver started driving a tractor before a pressure in a air reservoir of the braking system is at least a threshold, such as 65 psi.

The at least one processor may detect a dynamic pressure fault when pneumatic issues occur in the braking system at the trailer or at a braking system of a dolly that is part of the tractor trailer configuration.

At step 206, the at least one processor associates the VIN of the tractor with the detected fault of the braking system, and at step 208, the at least one processor stores the associated fault of the braking system and the associated VIN of the tractor in memory. In implementations where the tractor trailer configuration includes dollies, at steps 206 and 208, the at least one processor may also associate the VINs of the dollies with the detected fault of the braking system and records the VINs of the dollies in the memory as well.

It will be appreciated that the above-recited steps are repeated during operation while the trailer is operated with the same tractor or different tractors. As the above-recited steps are repeated and the at least one processor stores faults of the braking system and associated VINs in memory, the memory stores a plurality of detected faults and the VINs of the trailer and/or dollies associated with the detected faults.

At step 210, the at least one processor analyzes the plurality of faults and associated VINs stored in the memory, and at step 212, the at least one processor determines whether a number of faults of the braking system of the trailer that are associated with a VIN of a particular trailer or a particular type of trailer exceeds a threshold.

For example, the at least one processor may determine whether a number of voltage faults associated with a VIN of a tractor is more than a threshold. In some implementations, the threshold may be set at a value such as ten that is consistent across a fleet of vehicles. When the number of voltage faults exceeds the threshold, the at least one processor determines that the faults are likely caused by a problem with a battery or electrical system of that particular tractor.

In another example, the at least one processor may determine whether a number of trailer roll stability (TRSP) faults associated with a VIN of a tractor is more than a threshold. In some implementations, the threshold may be set at a value such as ten that is consistent across a fleet of vehicles. When the number of trailer roll stability faults exceeds the threshold, the at least one processor determines that the faults are likely caused by a problem originating from that particular tractor, whether the problem is mechanical in nature at the tractor or is caused by aggressive driving from a driver of that trailer.

In a further example, the at least one processor may determine whether a number of low pressure faults associated with a VIN of a tractor is more than a threshold. In some implementations, the threshold may be set at a value such as ten that is consistent across a fleet of vehicles. When the number of low pressure faults exceeds the threshold, the at least one processor determines that the faults are likely caused by a problem originating from that particular tractor, whether the problem is mechanical in nature at the tractor or is caused by a driver operating a trailer while a parking brake is not fully released.

In another example, the at least one processor may determine whether a number of dynamic pressure faults associated with a VIN of a tractor and/or a VIN of a dolly is more than a threshold. In some implementations, the threshold may be set at a value such as ten that is consistent across a fleet of vehicles. When the number of dynamic pressure faults exceeds the threshold, the at least one processor determines that the faults are likely caused by a pneumatic issue originating from that particular tractor or that particular dolly.

When the at least one processor determines at step 212 that the number of faults of the braking system of the trailer that are associated with a VIN of a particular trailer or a particular type of trailer does not exceed the threshold, the system continues to operate normally and the above-described steps are repeated.

Alternatively, when the at least one processor determines at step 212 that the number of faults of the braking system of the trailer that are associated with a VIN of a particular trailer or a particular type of trailer does exceed the threshold, at step 214, the at least one processor sends a message to at least one of the tractor associated with the VIN or a fleet control system regarding the faults.

In some implementations, the message may be a visual message displayed to a driver of the trailer on a display screen of the tractor or on a phone or tablet of the driver in communication with the trailer, a warning light that illuminates at the trailer such as a brake system light, and/or the message may be an audio message emitted through an audio system of the trailer or a speaker of a phone or tablet of the driver in communication with the trailer.

While steps 210, 212, and 214 are described above as being performed by at least one processor of a braking system positioned at a trailer, it will be appreciated that in other implementations, at least steps 210, 212, and 214 may be performed by at least one processor of a server of a fleet control system. In some implementations, the at least one processor of the system positioned at the trailer may transmit information stored in the memory regarding the plurality of detected faults and the associated VINs to the server of the fleet control system where the data is stored and analyzed. In other implementations, a server of the fleet control system may access the memory of the system positioned at the trailer to analyze the plurality of detected faults and associated VINs. As described above, communications between the braking system positioned at the trailer and the fleet control system may be wired or wireless communications.

FIGS. 1 and 2 and their accompanying description teach systems and methods for identifying tractors and/or dollies associated with system faults at a trailer in a tractor trailer configuration. As described above, systems of a braking system positioned at a trailer associate identifiers of a tractor or dolly, such as VINs, with system faults detected at the trailer. As a result, when a plurality of systems faults at a trailer are examined, patterns with associated trailers or types of trailers that may be contributing to the system faults are identified for repair.

The foregoing disclosure has been set forth to illustrate the invention and is not intended to be limiting. Since modifications of the disclosed form and implementations incorporating the spirit and substance of the invention may occur to persons skilled in the art, the invention should be construed to include everything within the scope of the appended claims and equivalents thereof.

The invention claimed is:

1. A system positioned on a trailer, comprising:
 a memory; and
 at least one processor of a braking system configured to execute instructions stored in the memory and to:
  receive a vehicle identification number ("VIN") from a tractor that is connected to the trailer;
  detect a fault of the braking system of the trailer; and
  associate the VIN of the tractor with the fault of the braking system and store the associated fault of the braking system and the VIN of the tractor in the memory.

2. The system of claim 1, wherein the at least one processor is further configured to:
 request the VIN from the tractor.

3. The system of claim 2, wherein the at least one processor is configured to request the VIN from the tractor at powerup of the trailer.

4. The system of claim 1, wherein the at least one processor is further configured to:
 analyze a plurality of faults and associated VINs stored in the memory and determine that a number of faults of the braking system of the trailer that are associated with the VIN of the tractor exceeds a threshold; and
 send a message to at least one of the tractor or a fleet system in response to the determination that the number of faults of the braking system of the trailer that are associated with the VIN of the tractor exceeds the threshold.

5. The system of claim 4, wherein the message is sent to the tractor and the message is configured to cause a braking system light to illuminate at the trailer.

6. The system of claim 4, wherein the faults of the braking system associated with the VIN of the tractor indicate a voltage issue at the tractor.

7. The system of claim 4, wherein the faults of the braking system associated with the VIN of the tractor indicate instability events.

8. The system of claim 4, wherein the faults of the braking system associated with the VIN of the tractor indicate low pressure faults.

9. The system of claim 4, wherein the faults of the braking system associated with the VIN of the tractor indicate dynamic pressure faults.

10. A method, comprising:
 receiving, with at least one processor of a braking system positioned on a trailer, a vehicle identification number ("VIN") from a tractor that is connected to the trailer;
 detecting, with the at least one processor, a fault of the braking system of the trailer; and
 associating, with the at least one processor, the VIN of the tractor with the fault of the braking system and storing, with the at least one processor, the associated fault of the braking system and the VIN of the tractor in a memory.

11. The method of claim 10, further comprising:
 requesting, with the at least one processor, the VIN from the tractor.

12. The method of claim 11, wherein the at least one processor requests the VIN from the tractor at powerup of the trailer.

13. The method of claim 10, further comprising:
- analyzing, with the at least one processor, a plurality of faults and associated VINs stored in the memory and determining, with the at least one processor, that a number of faults of the braking system of the trailer that are associated with the VIN of the tractor exceeds a threshold; and
- sending, with the at least one processor, a message to at least one of the tractor or a fleet system in response to determining that the number of faults of the braking system of the trailer that are associated with the VIN of the tractor exceeds the threshold.

14. The method of claim 13, wherein the message is sent to the tractor and the message is configured to cause a braking system light to illuminate at the trailer.

15. The method of claim 13, wherein the faults of the braking system associated with the VIN of the tractor indicate a potential voltage issue at the tractor.

16. The method of claim 13, wherein the faults of the braking system associated with the VIN of the tractor indicate instability events.

17. The method of claim 13, wherein the faults of the braking system associated with the VIN of the tractor indicate low pressure faults.

18. A system positioned on a trailer, comprising:
- a memory; and
- at least one processor of a braking system configured to execute instructions stored in the memory and to:
  - receive a first vehicle identification number ("VIN") from a tractor that is connected to the trailer;
  - receive a second VIN from a dolly that is connected to the trailer;
  - detect a fault of the braking system of the dolly; and
  - associate the first VIN of the tractor and the second VIN of the dolly with the fault of the braking system and store the associated fault of the braking system and the first VIN of the tractor and the second VIN of the dolly in the memory.

19. The system of claim 18, wherein the at least one processor is further configured to:
- analyze a plurality of faults and associated VINs stored in the memory and determine that a number of faults of the braking system of the dolly that are associated with the VIN of the dolly exceeds a threshold; and
- send a message to at least one of the tractor or a fleet system in response to the determination that the number of faults of the braking system of the dolly that are associated with the VIN of the dolly exceeds the threshold.

20. The system of claim 4, wherein the faults of the braking system associated with the VIN of the tractor indicate dynamic pressure faults.

* * * * *